United States Patent [19]

Moshier et al.

[11] Patent Number: 4,928,592
[45] Date of Patent: May 29, 1990

[54] DUAL INJECTION CAKE FILLER APPARATUS

[75] Inventors: Mark Moshier, Manchester; Ron Politte, Bridgeton, both of Mo.

[73] Assignee: Continental Baking Company, St. Louis, Mo.

[21] Appl. No.: 352,005

[22] Filed: May 15, 1989

[51] Int. Cl.$^5$ .......................... A21C 9/00; A23G 1/20
[52] U.S. Cl. .................... 99/450.8; 99/450.1; 99/494; 99/533; 141/100; 141/241; 222/145; 222/330; 425/130; 425/133.1
[58] Field of Search ................ 99/450.8, 450.1, 450.2, 99/450.6, 345, 353, 355, 419, 494, 532, 533; 222/330, 334, 310, 145, 139; 239/429, 431, 565; 426/281; 425/131.1, 130, 133.1; 604/239, 187; 128/303.18, 339

[56] References Cited

U.S. PATENT DOCUMENTS

| | | |
|---|---|---|
| 2,568,491 | 9/1951 | Edwards .................... 425/133.1 |
| 2,646,190 | 1/1953 | Hensgen et al. . |
| 2,673,675 | 3/1954 | Anderson . |
| 2,721,008 | 10/1955 | Morgan, Jr. . |
| 2,784,681 | 3/1957 | Orrell . |
| 2,934,243 | 4/1960 | Metzger ..................... 222/145 |
| 3,129,673 | 4/1964 | Stanley et al. . |
| 3,279,393 | 6/1966 | Otken . |
| 3,327,651 | 6/1967 | Nielsen . |
| 3,347,287 | 10/1967 | Geber . |
| 3,465,693 | 9/1969 | Lopata . |
| 3,481,209 | 12/1969 | Lunin . |
| 3,490,654 | 1/1970 | Fischer . |
| 3,497,111 | 2/1970 | Savage . |
| 3,669,005 | 6/1972 | Fullerton ..................... 99/450.1 |
| 3,881,529 | 5/1975 | Mannara . |
| 3,886,973 | 6/1975 | Kinney ..................... 425/131 |
| 3,911,972 | 10/1975 | Hubers et al. . |
| 3,923,437 | 12/1975 | Gahagan ..................... 99/450.8 |
| 3,951,311 | 4/1976 | Johansson ..................... 222/145 |
| 3,952,782 | 4/1976 | Mannara ..................... 239/431 |
| 3,999,691 | 12/1976 | Doom . |
| 4,237,145 | 12/1980 | Risman et al. ..................... 99/450.7 |
| 4,486,163 | 12/1984 | Pfeilstetter ..................... 425/133.1 |
| 4,630,533 | 12/1986 | Schaaf et al. ..................... 99/353 |
| 4,643,336 | 2/1987 | Mandeville et al. ............... 222/145 |
| 4,659,580 | 4/1987 | Svengren ..................... 99/450.1 |
| 4,699,047 | 10/1987 | Lee et al. ..................... 99/450.2 |
| 4,752,488 | 6/1988 | Hayashi et al. ............... 99/450.8 |

FOREIGN PATENT DOCUMENTS 1211912 3/1966 Fed. Rep. of Germany ..... 99/450.7
2126581 5/1971 Fed. Rep. of Germany .

Primary Examiner—Timothy F. Simone
Attorney, Agent, or Firm—Price, Heneveld, Cooper, De Witt & Litton

[57] ABSTRACT

An apparatus for injecting soft baked goods or cakes with different fluids includes a manifold defining a pair of spaced supply channels or chambers, a supply valve defining a port and a slide gate valve. The slide gate valve communicates with a passage and suck back chamber. A suck back piston is positioned within the suck back chamber. Secured to the underside of the manifold is a needle plate. A plurality of dual passage injection needles are secured to the plate. The plate defines a plurality of channels which communicate with the injection needles.

30 Claims, 2 Drawing Sheets

DUAL INJECTION CAKE FILLER APPARATUS

BACKGROUND OF THE INVENTION

The present invention relates to apparatus for filling cake products or soft baked goods and more particularly to a novel injection head assembly for simultaneously filling such goods with different semi-fluid substances.

Various cake or soft baked goods are presently available which are filled with a cream or the like. Such goods are generally baked in individual pans. The pans are arranged in parallel rows and conveyed to a filler apparatus and injected. The apparatus fills a plurality of cakes with a single semi-fluid substance, such as a cream. Typical cake filler apparatus includes a main frame, a conveyor supporting a plurality of the pans in elongated, tandemly arranged rows, a filler injection head and a lifter frame. The filler injection head is fixed on the main frame. The lifter frame raises the pans and hence the cakes into contact with the injection needles. An example of one such apparatus may be found in U.S. Pat. No. 3,669,005 entitled CREAM FILLER APPARATUS and issued on June 13, 1972 to Fullerton.

An example of an injection head used in presently existing cream filler apparatus may be found in U.S. Pat. No. 3,999,691 entitled CAKE FILLER and issued on Dec. 28, 1976 to Doom. As shown therein, the filler includes a manifold assembly having a supply channel or chamber which communicates with a needle plate through a supply valve, a slide gate valve and a gate port. A suck back piston is positioned in a suck back chamber. The suck back piston counteracts the tendency of the fluid substance dispensed by the head to extrude through the dispensing needles and drip or smear on the exterior surface of the baked goods. A plurality of injection needles are supported on the needle plate. The needles communicate with an input aperture through an interconnecting array of branching channels.

Presently existing cake or soft baked goods filling apparatus suffer from several problems or limitations. For example, such are limited to the injection of a single substance. Presently existing equipment cannot produce a cake simultaneously filled with two different substances, such as cream and fruit fillings.

SUMMARY OF THE INVENTION

In accordance with the present invention, the aforementioned problems are solved. Essentially, a dual injection cake filler assembly or injection head is provided. The head includes a manifold for directing two fluid substances to a needle plate. Supported on the needle plate are a plurality of dual passage injection needles. Provision is made for directing the different fluid substances to each of the needles. The needles of the head can simultaneously inject fluid substances from different sources into the cake.

DETAILED DESCRIPTION OF THE PREFERRED EMBODIMENT

Figure 1:
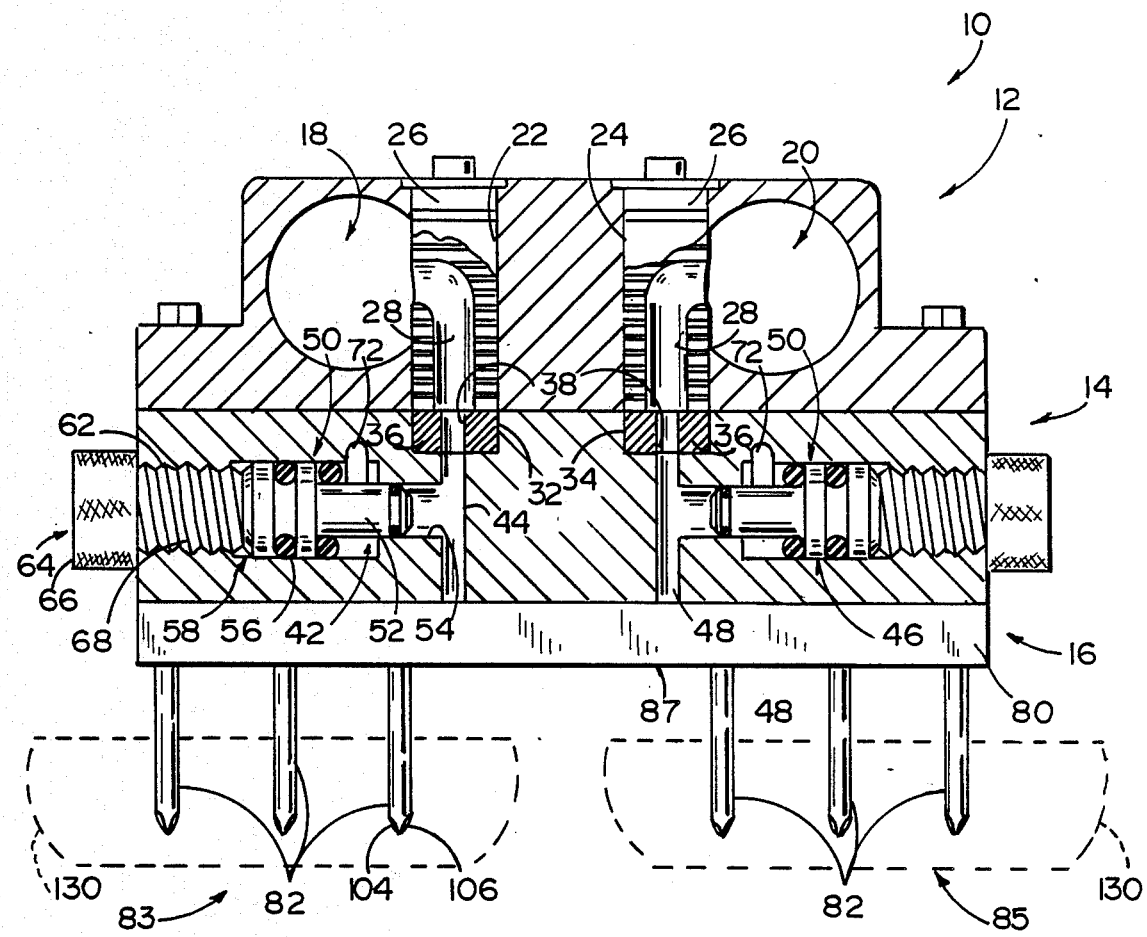
FIG. 1 is a transverse, cross-sectional view of a dual injection head in accordance with the present invention.

An injection head or cake filler apparatus in accordance with the present invention is illustrated in FIG. 1 and generally designated by the numeral 10. FIG. 1 illustrates a transverse cross section of an elongated head. Apparatus 10 includes an upper manifold 12, a lower manifold 14 and a needle plate assembly 16. Upper manifold 12 defines elongated main supply chambers or channels 18, 20. Channels 18, 20 are connected to suitable sources of the desired fillers. The fillers could be the same. The apparatus, however, permits injection of two different fillers, such as a cream and a fruit. The fillers are delivered to a respective channel 18, 20 under pressure. Upper manifold 12 defines a pair of vertical bores 22, 24. Bores 22, 24 receive adjustable valves 26. Valves 26 each define a generally L-shaped bore or valve port 28. Valves 26 are rotatably positionable within bores 22, 24 so that valve ports 28 may be selectively aligned with their respective chambers 18, 20. When so positioned, fluid will flow from the chambers through the ports.

Lower manifold 14 defines elongated grooves 32, 34. Slidably positioned in each of the grooves is a slide valve 36. Each slide valve 36 defines an aperture 38. Each aperture is alignable with one of the valve ports 28 upon sliding movement of valve 36. Lower manifold 14 also defines a suck back chamber 42 which intersects with a throughbore or outlet passage 44. A second suck back chamber 46 intersects with a throughbore or outlet passage 48. Passage 44 is aligned with bore 22 and passage 48 is aligned with bore 24.

A suck back piston 50 is positioned within each suck back chamber 42, 46. Each piston 50 includes a reduced diameter portion 52 extending within a reduced bore portion 54. Bore portion 54 opens into an enlarged bore portion 56. Piston 50 includes an enlarged diameter portion 58 slidable within bore portion 56. Bore 56 includes a threaded portion 62. An adjustment cap 64, including a head 66 and a threaded portion 68, is threaded into portion 62. Chambers 42, 46 define a pressure or air inlet port 72. In addition, another air inlet is positioned adjacent the threaded portion of the chambers and at the rear of the enlarged piston portion. As should be apparent, air under pressure entering ports 72 will shift the suck back pistons away from their respective vertical passages 44, 48, creating a suction effect within the passages. Air or other fluid under pressure exerted against the backside of the enlarged piston portions will shift the pistons towards their passages to help force fluid therein towards the needle plate assembly 16. The suck back pistons operate in essentially the same manner as set forth in the aforementioned U.S. Pat. No. 3,999,691.

Needle plate assembly 16 includes a needle plate 80 and a plurality of dual passage needles 82. Needles 82, as best seen in FIG. 1, are divided into two sets 83, 85, each including three needles. The fluid substances in the main supply chambers or channels 18, 20 are directed through bores 44, 48 to needle plate 80. Provision is made for distributing the fluid to each of the needles 82. Each needle simultaneously injects both fluids into the cake or soft baked good product.

Needle plate 80 includes an upper surface 84 and a lower, flat surface 87. Upper surface 84 defines a plurality of needle apertures 86. Needles 82 are press-fitted within the apertures 86. A pair of delivery or feed channels 88, 89 extend in spaced, parallel relationship on opposite sides of needle apertures 86. Channels 88, 89 intersect main hemispherical inlet ports or recesses 90, 92. Recesses 90, 92 are generally circular in plan. The plate assembly is dimensioned so that port 90 is coaxial with through passage 48 of lower manifold 14. Port 92 is coaxial with through passage 44 of lower manifold 14. As a result, the fluid substances being delivered from the upper manifold will be directed into the respective ports 90, 92 and will proceed along feed channels 88, 89.

Figure 2:
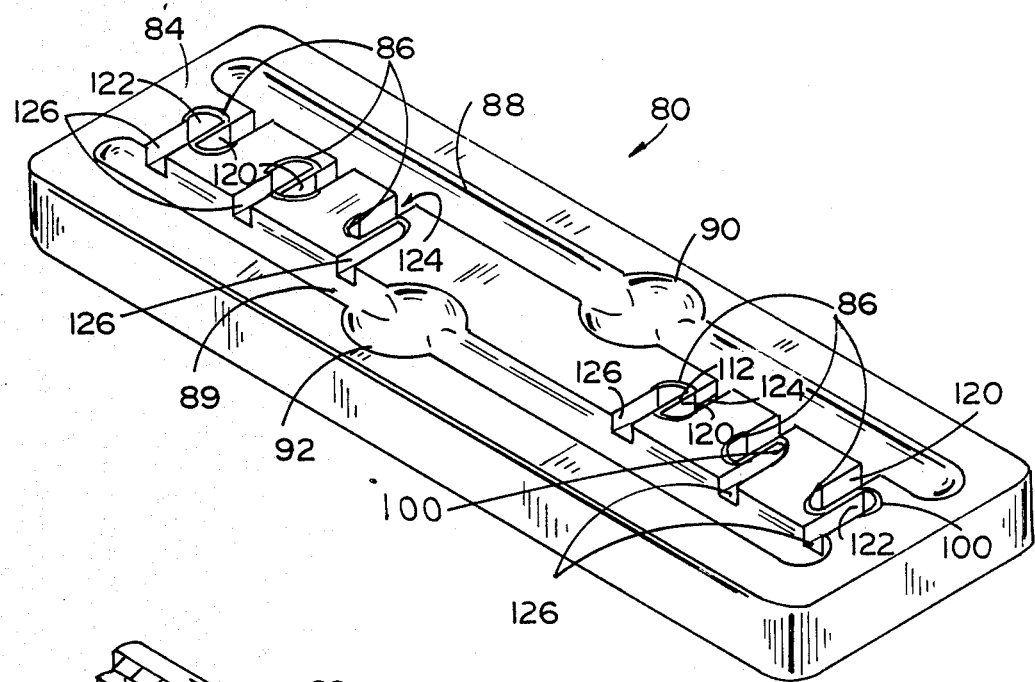
FIG. 2 is a top, perspective view of a needle plate in accordance with the present invention.
Figure 3:
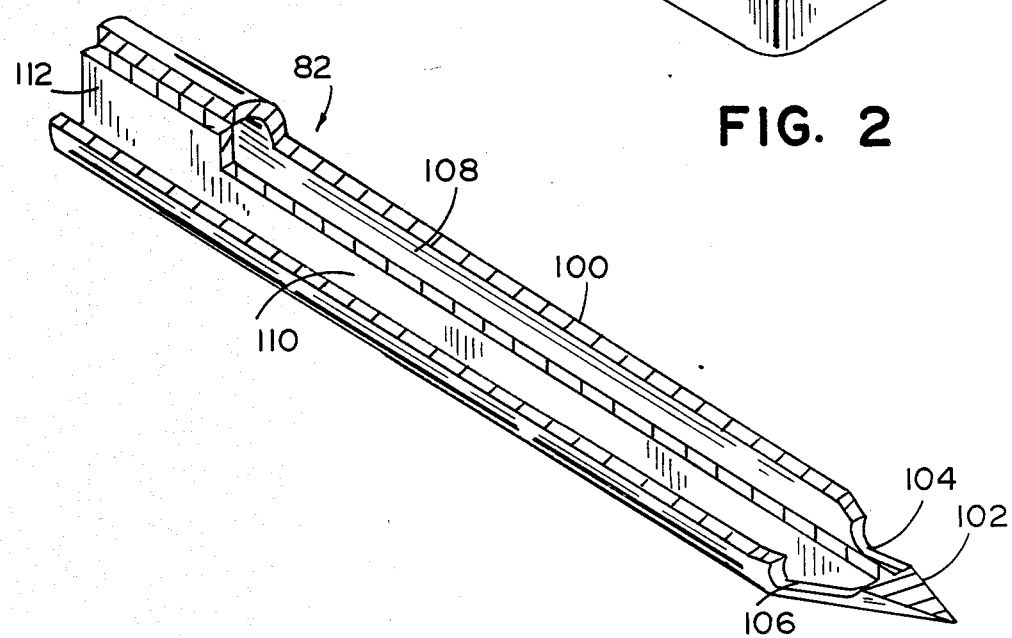
FIG. 3 is a cross-sectional view of a dual passage injection needle employed in the present invention.

As seen in FIGS. 2 and 3, each needle 82 includes an upper elongated cylindrically shaped portion 100 and a lower conical portion 102. Portion 102 defines outlet ports 104, 106. The interior of needle 82 is divided into separate passages 108, 110 by a divider plate 112. As seen in FIG. 2, the upper end of cylindrical portion 110 defines passages or inlets 120, 122. Each passage inlet 120 is connected to channel 88 by a secondary channel feed or needle inlet portion 124. Each passage or needle inlet 122 is connected to feed channel 89 by a secondary channel feed or needle inlet portion 126. As a result, passages 108 and 110 of needle 82 will be fed fluid substances from respective one of the channels 88, 89 and hence the main supply chambers or channels 18, 20.

In order to insure that substantially equal quantities of the fluids exit from the needle outlets 104, 106 regardless of the position of the needle along the feed channels 88, 89, provision must be made to accommodate the pressure drop as the fluid flows along the channels. As seen in FIG. 2, the secondary channel feeds 126 and 124 closest to their respective main inlet ports or recesses 90, 92 have a depth dimension which is less than the depth dimensions of the downstream secondary feed channels. The further the feed channel is from the inlet ports, the greater the depth dimension. As a result, the pressure differential is accommodated and substantially equal flow from the outlets is achieved.

Operation

In operation, chambers 18, 20 of injection head 10 are connected to suitable sources of fluids. One source may supply a cream, and the other source may supply a fruit filling. Valves 26 within the respective bores 22, 28 are adjusted so that fluid flows to slide valves 36. Valves 36 are opened with ports 38 aligned with valve ports 28. Fluid is then discharged through throughbores or passages 44, 48 to hemispherical inlet portions 90, 92. Pressure may be applied behind the enlarged portions of the suck back pistons 50. Reduced cylindrical portions 52, therefore, move towards their respective bores 44, 48 to assist in forcing fluid into the needle plate assembly 16. Fluid passes along the supply channels 88, 89 to a respective inlet port of the dual passage needles. The fluid then passes downwardly through the passages 108, 110 to the discharge outlets 104, 106. As described in the aforementioned U.S. Pat. No. 3,669,005, cakes 130, schematically shown in FIG. 1, are moved upwardly into engagement with the needles. In the embodiment illustrated, a pair of cakes would be arranged tandemly so that the first set of needles engages one of the cakes, and the second set engages the second of the cakes. The combination fluid substance is injected into the cakes. Upon completion of the injection cycle, the cakes are lowered. The suck back pistons are moved away from their respective passages 44, 48 creating a suction therein which pulls the fluid back up from the needles. This eliminates dripping or smearing on the cake exterior surface.

A plurality of individual needle plate assemblies 16 and corresponding valves and suck back pistons are supported or mounted on manifolds 12, 14. In a presently existing embodiment, eighteen plates are supported on the undersurface of lower manifold 14. As a result, thirty-six cakes may be simultaneously injected with two different fluid substances. In an existing embodiment, plate 80 has an overall length dimension of approximately 8.25 inches and a width of 1.75 inches. Needle apertures 86 are positioned in two groups along the longitudinal centerline of plate 80. The outermost apertures are positioned on a center 0.312 inch from the ends of the plate. The apertures are then positioned from each other on 1.175 inch centerlines. Recesses 90, 92 are positioned from the closest adjacent needle aperture on 0.720 centers. The needle apertures 86 have a diameter of 0.312 inch. The depths of the secondary feed channels 122, 124 vary from their respective supply recesses 90, 92 towards the ends of the plates with increasing depths. In the existing embodiment, the channel closest to a port 90, 92 has a depth of 0.041 inch, the next channel has a depth of 0.085 inch and the outermost channel has a depth of 0.125 inch. The channels 88, 89 and recesses 90, 92 have depths of 0.125 inch. The undersurface of manifold 14 is flat.

In view of the foregoing description, one of ordinary skill in the art may envision various modifications which would not depart from the inventive concepts disclosed. For example, channels 88, 89 and secondary channel feeds 124, 126 could be formed in the undersurface of lower manifold 14. The upper surface of the needle plate 80 would, therefore, become flat. Such would involve only a reversal in the positioning of the channels and elements. The above description should, therefore, be considered as only that of the preferred embodiment. The true spirit and scope of the present invention may be determined by reference to the appended claims.

The embodiments of the invention in which an exclusive property or privilege is claimed are defined as follows:

1. A dual injection cake filler assembly for injecting cakes with semi-fluid substances, said assembly comprising:
   a manifold defining a pair of spaced supply channels each having an outlet passage;
   valve means on said manifold for controlling flow from said channels to said outlet passages;
   a needle plate secured to said manifold, said needle plate defining a pair of inlet recesses, a plurality of needle apertures, a pair of delivery channels with each channel extending from one of said inlet recesses and a plurality of needle inlet portions between said channels and said needle apertures; and
   a plurality of split needles each disposed in one of said needle apertures and defining a pair of passages having upper inlets and lower needle outlet ports, said upper inlets each communicating with one of said channels through one of said needle inlet portions, said channels and needle inlet portions being dimensioned so that substantially uniform quantities of semi-fluid material are ejected from said needle discharge ports whereby a single cake may be simultaneously filled with two different fillings.

2. A dual injection cake filler as defined by claim 1 wherein said plurality of needles define first and second sets, said sets each including an equal number of needles.

3. A dual injection cake filler as defined by claim 2 wherein said delivery channels extend in spaced, generally parallel relationship from said inlet recesses.

4. A dual injection cake filler as defined by claim 3 wherein each of said needles includes a elongated cylinder having a lower cone portion, said needle outlet ports opening through said cone portion.

5. A dual injection cake filler as defined by claim 4 wherein said needles each include an elongated divider plate dividing said needle into said passages.

6. A dual injection cake filler as defined by claim 5 wherein said needle inlet portions have different depth dimensions.

7. A dual injection cake filler as defined by claim 1 wherein each of said needles includes an elongated cylinder having a lower cone portion, said needle outlet ports opening through said con portion.

8. A dual injection cake filler as defined by claim 7 wherein said needles each include an elongated divider plate dividing said needle into said passages.

9. A dual injection cake filler as defined by claim 8 wherein said needle inlet portions have different depth dimensions.

10. An injection die assembly for use with a cake filler machine, said assembly comprising:
    an elongated plate having an upper surface and a lower surface;
    a plurality of needle apertures extending between said surfaces;
    a pair of elongated channels defined by an opening through said upper surface, said channels extending in spaced relationship on opposite sides of said needle apertures; and
    a plurality of dual passage needles, each needle being disposed in one of said needle apertures, said needles each defining first and second needle inlets, a pair of fluid passages and a pair of needle outlets, one of said channels being connected to said first needle inlets and the other of said channels being connected to said second needle inlets.

11. An injection die assembly as defined by claim 10 wherein said channels each define an enlarged inlet recess configured to receive a semi-fluid substance which is directed to said needle inlets by said channels.

12. An injection die assembly as defined by claim 11 wherein said top surface of said plate further defines a plurality of secondary channel feed portions interconnecting said channels with each of said needles, said channels and said channel feed portions being dimensioned so that substantially equal quantities of the semi-fluid substances may be delivered to said needles.

13. An injection die assembly as defined by claim 10 wherein each of said needles comprises:
    a member having an elongated cylindrical portion, an upper inlet portion and a lower discharge portion, said lower discharge portion being conical in shape and defining said needle outlets.

14. An injection die assembly as defined by claim 13 wherein each of said needles further comprises:
    an elongated divider plate extending within an interior of said member and separating the needle into said pair of fluid passages.

15. An injection die assembly as defined by claim 13 wherein said channels each define an enlarged inlet recess configured to receive a semi-fluid substance which is directed to said needle inlets by said channels.

16. An injection die assembly as defined by claim 15 wherein each of said needles further comprises:
    an elongated divider plate extending within an interior of said member and separating the needle into said pair of fluid passages.

17. An injection die assembly as defined by claim 12 wherein said channels extend in spaced, parallel relationship and said needles are separated into at least two groups, arranged in tandem along a longitudinal centerline of said plate.

18. An injection die assembly as defined by claim 17 wherein said secondary channel feed portions have different depth dimensions within each group.

19. An injection die assembly as defined by claim 16 wherein said channels extend in spaced, parallel relationship and said needles are separated into at least two groups, arranged in tandem.

20. An injection die assembly as defined by claim 19 wherein said secondary channel feed portions have different depth dimensions.

21. An injection die assembly as defined by claim 18 wherein said enlarged inlet recesses are substantially hemispherical in shape.

22. An injection die assembly as defined by claim 21 wherein each of said needles comprises:
    a member having an elongated cylindrical portion, an upper inlet portion and a lower discharge portion, said lower discharge portion being conical in shape and defining said needle outlets.

23. An injection die assembly as defined by claim 22 wherein each of said needles further comprises:
    an elongated divider plate extending within the interior of said member and separating the needle into said pair of fluid passages.

24. A dual injection cake filler head comprising:
    an upper manifold defining spaced, parallel, main supply chambers, said chambers being intersected by valve bores;
    a lower manifold defining a pair of throughbores each aligned with one of said valve bores;
    valve means between said upper and lower manifolds for controlling the flow of fluids from said supply chambers to said throughbores;
    a needle plate secured to said lower manifold and defining a plurality of needle apertures;
    a plurality of dual passage needles, each needle being positioned within one of said needle apertures, said needles each defining a pair of inlets and a pair of outlets; and
    one of said lower manifold and said needle plate defining port and channel means for connecting a first of said needle inlets with one of said throughbores and a second of said needle inlets with the other of said throughbores so that fluids from said chambers are simultaneously discharged from the outlets of said needles.

25. A dual injection cake filler head as defined by claim 24 wherein said port and channel means are defined by said needle plate.

26. A dual injection cake filler head as defined by claim 24 further including supply valves, each supply valve being disposed in one of said valve bores and defining a valve port.

27. A dual injection cake filler head as defined by claim 26 wherein said valve means comprises:
    a gate valve defining a gate valve port, said gate valve being slidably mounted on said lower manifold.

28. A dual injection cake filler head as defined by claim 27 further including:

suck back means on said lower manifold and intersecting said throughbores for sucking back fluid from said needles.

29. A dual injection cake filler head as defined by claim 28 wherein said port and channel means are defined by said needle plate.

30. A dual injection cake filler head as defined by claim 29 wherein each of said needles comprises:
an elongated cylindrical member having a lower conical portion, said conical portion defining said outlets and a divider plate within said member separating said member into a pair of passages.

* * * * *